(12) United States Patent
Kobayashi et al.

(10) Patent No.: US 8,687,057 B2
(45) Date of Patent: Apr. 1, 2014

(54) THREE-DIMENSIONAL MEASUREMENT APPARATUS AND CONTROL METHOD THEREFOR

(75) Inventors: Kazuhiko Kobayashi, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 12/977,031

(22) Filed: Dec. 22, 2010

(65) Prior Publication Data

US 2011/0164114 A1    Jul. 7, 2011

(30) Foreign Application Priority Data

Jan. 6, 2010    (JP) ................................ 2010-001561

(51) Int. Cl.
| H04N 15/00 | (2006.01) |
|---|---|
| H04N 13/00 | (2006.01) |
| H04N 9/47 | (2006.01) |
| H04N 7/18 | (2006.01) |

(52) U.S. Cl.
USPC ................. 348/135; 348/42; 348/46; 348/61; 348/86; 348/140; 348/142

(58) Field of Classification Search
USPC ................... 348/42, 46, 61, 86, 135, 140, 142
See application file for complete search history.

(56) References Cited

U.S. PATENT DOCUMENTS

| 4,886,943 A | 12/1989 | Suzuki et al. |
|---|---|---|
| 4,887,245 A | 12/1989 | Mori et al. |
| 4,910,363 A | 3/1990 | Kobayashi et al. |
| 4,931,965 A | 6/1990 | Kaneko et al. |
| 4,980,518 A | 12/1990 | Kobayashi et al. |
| 5,051,601 A | 9/1991 | Atobe et al. |
| 5,070,325 A | 12/1991 | Tanaka et al. |
| 5,097,102 A | 3/1992 | Yoshimura et al. |
| 5,142,106 A | 8/1992 | Yoshimura et al. |
| 5,239,138 A | 8/1993 | Kobayashi et al. |
| 5,500,492 A | 3/1996 | Kobayashi et al. |
| 5,539,678 A | 7/1996 | Tanaka et al. |
| 5,565,893 A | 10/1996 | Sato et al. |
| 5,714,698 A | 2/1998 | Tokioka et al. |

(Continued)

OTHER PUBLICATIONS

Bitner, J., et al., "Efficient Generation of the Binary-Reflected Gray Code and its Applications," Communications of the ACM, vol. 19, No. 9, pp. 517-521, 1976.

(Continued)

*Primary Examiner* — Geepy Pe
(74) *Attorney, Agent, or Firm* — Fitzpatrick, Cella, Harper & Scinto

(57) ABSTRACT

A three-dimensional measurement apparatus generates patterns to be projected onto the measurement object, images the measurement object using an imaging unit after projecting a plurality of types of generated patterns onto the measurement object using a projection unit, and computes the coordinate values of patterns on a captured image acquired by the imaging unit, based on the projected patterns, a geometric model of the measurement object, and information indicating the coarse position and orientation of the measurement object. Captured patterns on the captured image are corresponded with the patterns projected by the projection unit using the computed coordinate values, and the distances between the imaging unit and the patterns projected onto the measurement object are derived. The position and orientation of the measurement object are estimated using the derived distances and the geometric model of the measurement object, and the information on the coarse position and orientation is updated.

8 Claims, 11 Drawing Sheets

(56) References Cited

U.S. PATENT DOCUMENTS

| | | |
|---|---|---|
| 5,726,686 A | 3/1998 | Taniishi et al. |
| 5,736,979 A | 4/1998 | Kobayashi et al. |
| 5,805,147 A | 9/1998 | Tokioka et al. |
| 5,818,429 A | 10/1998 | Tanaka et al. |
| 5,831,603 A | 11/1998 | Yoshimura et al. |
| 5,936,207 A | 8/1999 | Kobayashi et al. |
| 6,415,240 B1 | 7/2002 | Kobayashi et al. |
| 6,636,199 B2 | 10/2003 | Kobayashi |
| 6,834,250 B2 | 12/2004 | Uchiyama et al. |
| 6,853,935 B2 | 2/2005 | Satoh et al. |
| 6,862,019 B2 | 3/2005 | Kobayashi et al. |
| 6,956,503 B2 | 10/2005 | Yokokohji et al. |
| 7,075,524 B2 | 7/2006 | Kobayashi et al. |
| 7,423,553 B2 | 9/2008 | Yokokohji et al. |
| 7,486,281 B2 | 2/2009 | Kobayashi et al. |
| 7,538,894 B2 | 5/2009 | Kobayashi |
| 7,684,052 B2 * | 3/2010 | Suwa et al. .................. 356/601 |
| 2008/0031490 A1 | 2/2008 | Kobayashi |

OTHER PUBLICATIONS

Besl, P., et al., "A Method for Registration of 3-D Shapes," IEEE Transactions on Pattern Analysis and Machine Intelligence, vol. 14, No. 2, pp. 239-256, 1992.

Chen, Y., et al., "Object Modeling by Registration of Multiple Range Images," Proceedings of the IEEE International Conference on Robotics and Automation, vol. 3, pp. 2724-2729, 1991.

\* cited by examiner

THREE-DIMENSIONAL MEASUREMENT APPARATUS AND CONTROL METHOD THEREFOR

BACKGROUND OF THE INVENTION

1. Field of the Invention

The present invention relates to a three-dimensional measurement apparatus for measuring the position and orientation of a measurement object and a control method therefor.

2. Description of the Related Art

Three-dimensional measurement techniques used in imaging apparatuses include active stereo methods that enable corresponding points to be clearly determined by projecting structured light onto a measurement object. Active stereo methods are little affected by whether or not the object has a textured surface. With a coded pattern light projection method constituting one such active stereo method, partitioning into $2^n$ space codes is made possible by performing light projection and imaging n times, enabling accurate measurement to be performed at high speed. As for the coding method, the Gray code disclosed in James R. Bitner, Gideon Erlich, and Edward M. Reingold, "Efficient generation of the binary-reflected Gray code and its applications", Communications of the ACM, 19(9), pp. 517-521, 1976 (hereinafter, Document 1) is often used.

On the other hand, a method for estimating position and orientation, in the case where a geometric model of the measurement object surface is known and a plurality of distances of the measurement object surface from the imaging apparatus are derived as a point set, so as to reduce the difference in distance between the point set and the closest point, is described in P. J. Besl and N. D. McKay, "A method for registration of 3-D shapes", IEEE Transaction on Pattern Analysis and Machine Intelligence, 14(2): 239-256, Feb. 1992 (hereinafter, Document 2). This is widely used as an iterative closest point (ICP) method for distance measurement and alignment of geometric models. Similarly, Y. Chen and G. Medioni, "Object modeling by registration of multiple range images", Proceedings of the IEEE International Conference on Robotics and Automation, 1991, vol. 3, pp. 2724-2729, April 1991 (hereinafter, Document 3) involves calculating the distance between a set of measurement points and the surface of a geometric model, and enables the position and orientation of a measurement object to be estimated so as to minimize the error between the geometric model of the measurement object and the set of measurement points.

When the measurement object moves while projecting and imaging projection patterns, three-dimensional measurement fails because of not being able to find correspondences between patterns. Thus, with three-dimensional measurement of a moving measurement object, the time taken to perform projection and imaging for distance measurement needs to be shortened as much as possible. Measuring the orientation of a person is an example of the measurement of a moving measurement object. Mounting a measurement apparatus on a robot arm with visual feedback installed in the robot is an example of a projection/imaging entity that moves. Generally, three-dimensional measurement of a measurement object is possible by performing projection and imaging faster than the movement of the object. Faster projection and imaging of patterns for three-dimensional measurement of a moving measurement object is thus sought.

SUMMARY OF THE INVENTION

The present invention has been made in consideration of the above problems, and according to one embodiment thereof, a three-dimensional measurement apparatus capable of performing high-speed three-dimensional measurement using coded pattern projection and a control method thereof are provided.

According to one aspect of the present invention, there is provided a three-dimensional measurement apparatus comprising: a geometric model holding unit configured to hold a geometric model of a measurement object; a coarse position/orientation holding unit configured to hold information indicating a coarse position and orientation of the measurement object; a projection unit configured to project a plurality of types of patterns constituted by bright/dark contrast onto the measurement object; an imaging unit configured to image the measurement object onto which a pattern has been projected by the projection unit; a projection position calculation unit configured to compute coordinate values of the pattern on a captured image acquired by the imaging unit, based on the geometric model and the information indicating the coarse position and orientation; a distance calculation unit configured to search for a captured pattern on the captured image based on the coordinate values computed by the projection position calculation unit, and derive a distance between the imaging unit and a surface of the measurement object by corresponding the captured pattern with the projected pattern; and a position/orientation calculation unit configured to estimate the position and orientation of the measurement object using the distance derived by the distance calculation unit and the geometric model held in the geometric model holding unit, and update the information on the coarse position and orientation held in the coarse position/orientation holding unit.

According to one aspect of the present invention, there is provided a control method for a three-dimensional measurement apparatus comprising: a geometric model holding step of holding a geometric model of a measurement object in a geometric model holding unit; a coarse position/orientation holding step of holding information indicating a coarse position and orientation of the measurement object in a coarse position/orientation holding unit; a projection step of using a projection unit to project a plurality of types of patterns constituted by bright/dark contrast onto the measurement object; an imaging step of using an imaging unit to image the measurement object onto which a pattern has been projected in the projection step; a projection position calculation step of computing coordinate values of the pattern on a captured image acquired in the imaging step, based on the geometric model and the information indicating the coarse position and orientation; a distance calculation step of searching for a captured pattern on the captured image based on the coordinate values computed in the projection position calculation step, and deriving a distance between the imaging unit and a surface of the measurement object by corresponding the captured pattern with the projected pattern; and a position/orientation calculation step of estimating the position and orientation of the measurement object using the distance derived in the distance calculation step and the geometric model held in the geometric model holding unit, and updating the information on the coarse position and orientation held in the coarse position/orientation holding unit.

Further features of the present invention will become apparent from the following description of exemplary embodiments with reference to the attached drawings.

DESCRIPTION OF THE EMBODIMENTS

Hereinafter, embodiments of the present invention will be described using the drawings.

First Embodiment

Figure 1:
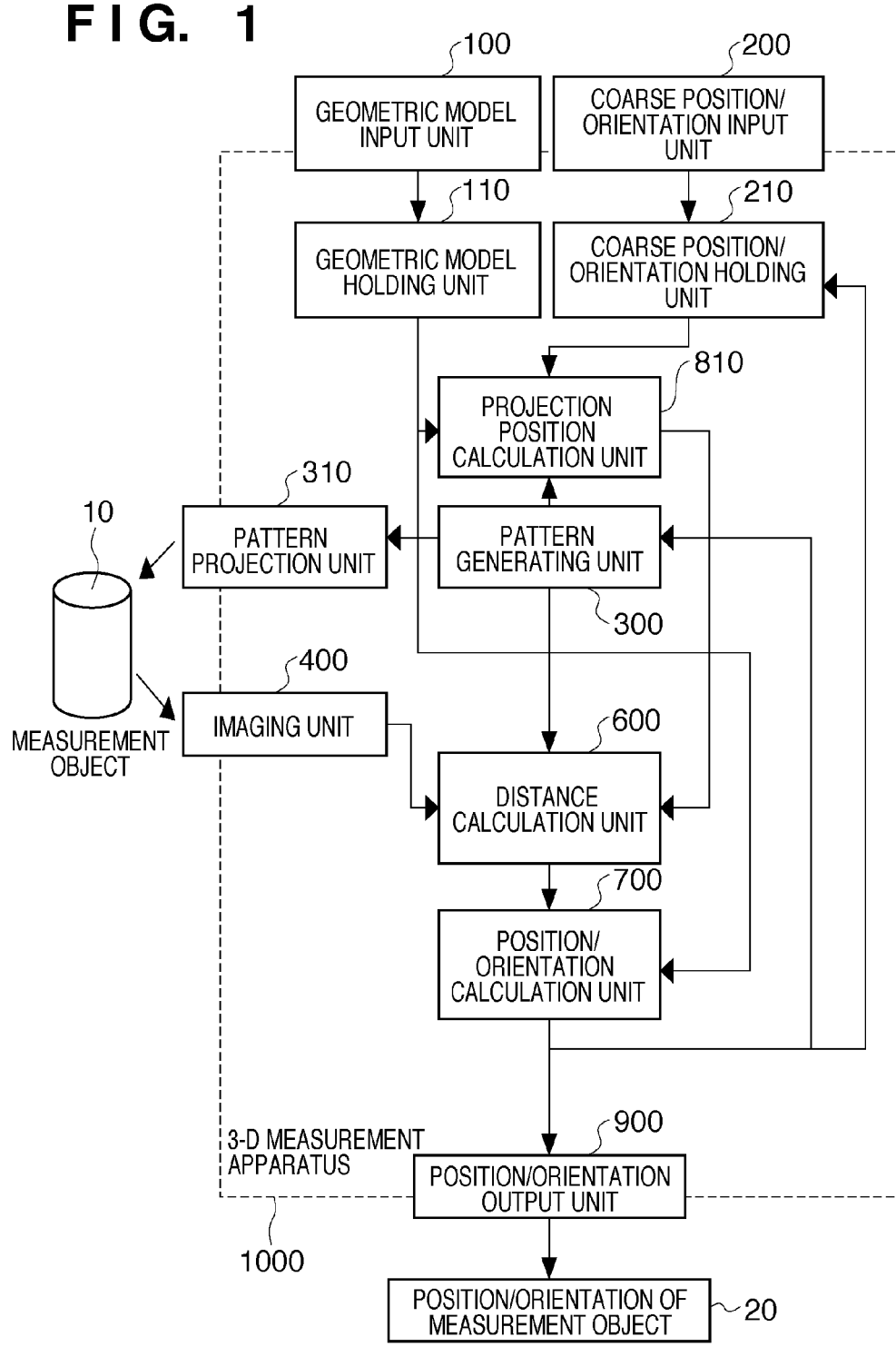
FIG. 1 is a block diagram showing an example configuration of a three-dimensional measurement apparatus according to a First Embodiment.
Figure 2:
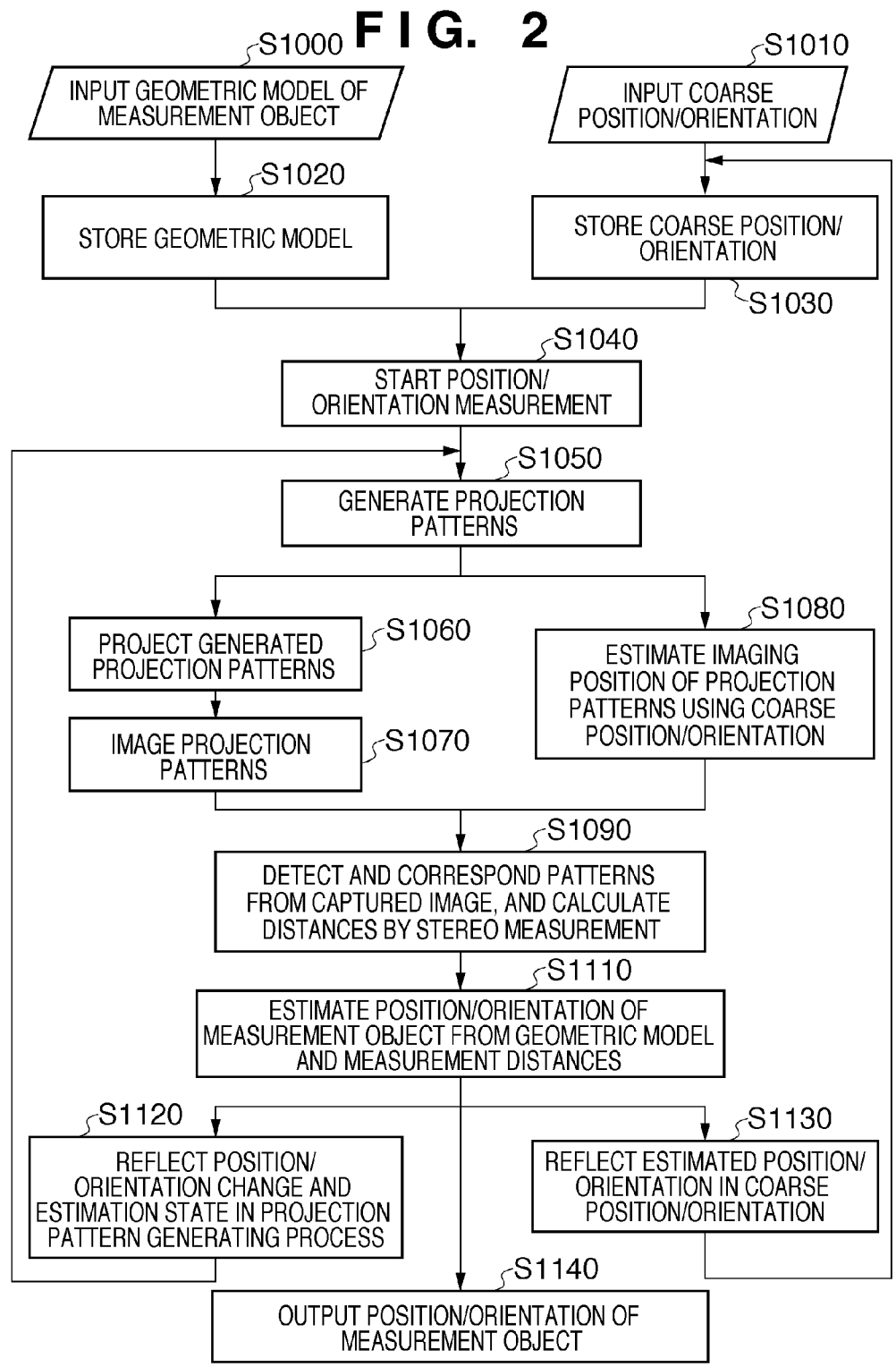
FIG. 2 is a flowchart showing processing by the three-dimensional measurement apparatus according to the First Embodiment.

FIG. 1 is a block diagram of a three-dimensional measurement apparatus according to one embodiment of the present invention. The flow of processing relating to FIG. 1 is shown in FIG. 2. The processing units of the three-dimensional measurement apparatus 1000 will now be described using these diagrams. Note that in the example of the three-dimensional measurement apparatus according to the present embodiment, inputs include a geometric model of the measurement object, an image captured of the measurement object and the coarse position and orientation of the measurement object, and an estimated position and orientation result is output.

In S1000, a geometric model input unit 100 inputs model information on a measurement object 10 constituting a three-dimensional shape. Model information may be input using a configuration in which information is read out from a recording apparatus or a recording medium such as a floppy (registered trademark) disk, CD-ROM, memory card, hard disk or flash memory. Information may also be accessed by connecting to a network server on which geometric models are registered and downloading an appropriate geometric model. Further, the user may be prompted to input the shape of an appropriate model using an interface such as a keyboard, mouse or the like, or candidates may be presented on a display for the user to select from. Component recognition for geometric model selection may also be used. Any method is applicable as long as a geometric model for use in measurement can be input.

In S1020, a geometric model holding unit 110 holds the input three-dimensional geometric model of the measurement object 10. Any method for representing the three-dimensional model is applicable as long as the model enables three-dimensional coordinates of the surface of the measurement object to be computed from an arbitrary three-dimensional view, and the representational format of the model is not particularly limited. Models for computing three-dimensional coordinates of the surface of a geometric model, for example, include:

a patch model constituted by information on three-dimensional vertices and planes connecting these vertices function representation describing the surface shape, or a set of surface functions combining coefficients of the functions a model holding the values of an area occupied by the object in spatial voxels In S1010, a coarse position/orientation input unit 200 inputs data on the coarse position and orientation of the measurement object 10. Here, the coarse position and orientation are parameters having the rotational degrees of freedom of the three-dimensional measurement apparatus and three translational degrees of freedom in a reference coordinate system set in the measurement space. At step S1030, the parameter values are converted into a state usable by the present apparatus and stored.

The range in which the measurement object 10 exists in the measurement space can be defined by position and orientation in the case of components that are supplied while remaining in physical contact with the parts feeder. Position and orientation can also be estimated in the range of results obtained by checking against images registered beforehand by a separate component recognition apparatus. Here, the coarse position and orientation are desirably represented by six degrees of freedom determining position and orientation in three-dimensional space. Any method of input to the coarse position/orientation input unit 200 is applicable as long as each position and orientation parameter can be input numerically, and signal input may be received after connecting to another sensor. In the case where the three-dimensional measurement apparatus 1000 is mounted at the end of the robot arm, it is also possible to use the position and orientation obtained by multiplying the offset between the position and orientation of the end effector and the mounting position by forward kinematics using the values of an encoder of each joint held by the robot arm. Here, any method that enables the current coarse position and orientation of the measurement object 10 in current three-dimensional measurement space to be acquired is applicable.

In S1030, a coarse position/orientation holding unit 210 holds the coarse position and orientation of the measurement object 10 in the reference coordinate system of the measurement space input by the coarse position/orientation input unit 200.

As for the holding method, the coarse position and orientation may be held using RAM or the like, or held in a nonvolatile memory, external storage apparatus or auxiliary apparatus. As for the coarse position and orientation information, any information is applicable as long as it has six degrees of freedom on position and orientation in the reference coordinate system. If constraints on the measurement object and the measurement space have been defined, these constraints can be transformed into the representation of position and orientation in the reference coordinate system.

In a state where preparation has been completed as a result of S1000 to S1030, processing for starting position/orientation measurement is performed from step S1040. At step s1040, variables used in the position/orientation measurement process are initialized. Since the three-dimensional measurement apparatus 1000 aims to successively measure the position and orientation of the measurement object 10, processing can start from step S1050, before the measurement object changes in the subsequent iterant measurement.

In S1050, a pattern generating unit 300 generates patterns for projecting on the measurement object 10. Space codes can be generated using Gray code patterns as disclosed in Document 1. Sine wave patterns may also be projected if the per-pixel luminance of a pattern projection unit 310 can be controlled. In the case of obtaining spatially discrete samples, a geometric figure disposed in a grid may be used. That is, patterns constituted as two-dimensional images can be generated using some algorithm as pattern generation. In the present example, patterns are handled as two-dimensional image data, and Gray code patterns are used as the pattern generating method.

Figure 3:
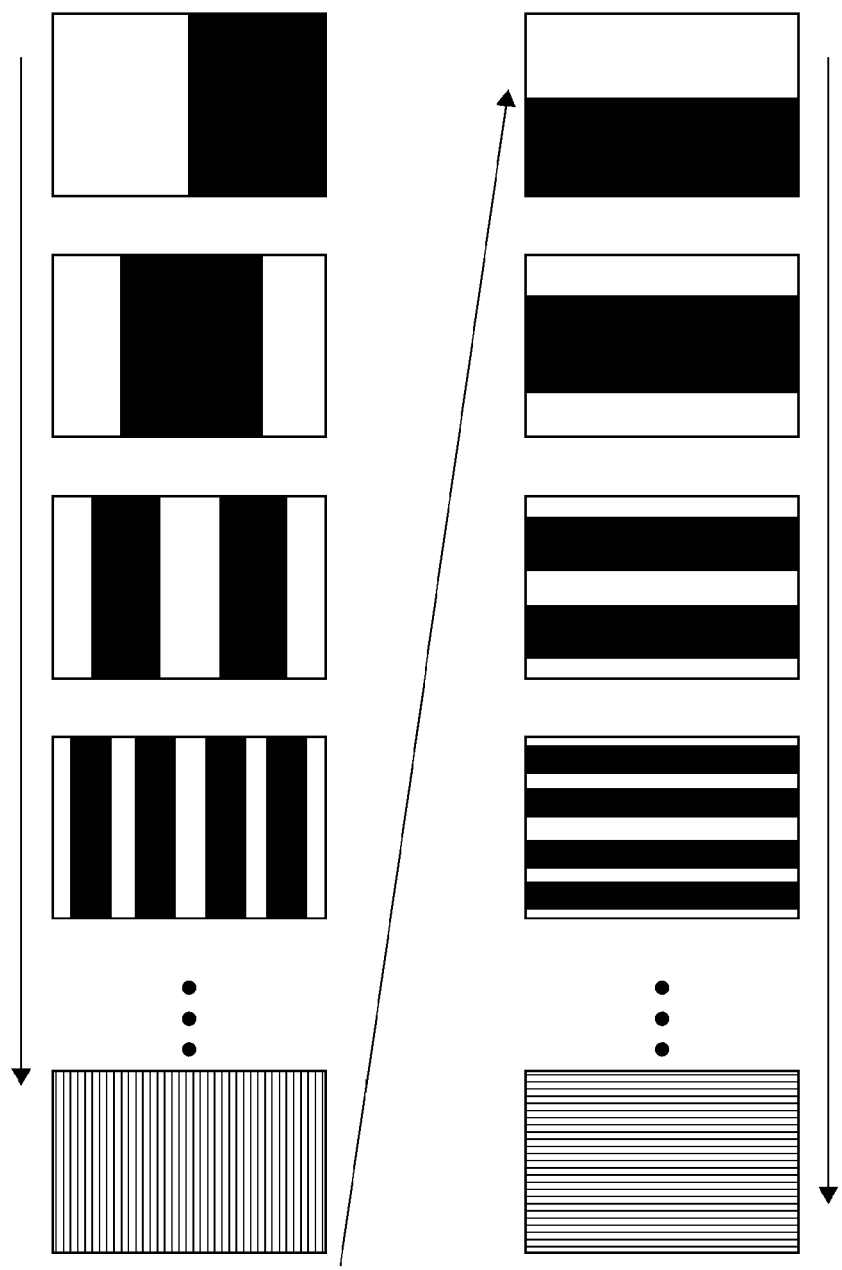
FIG. 3 shows example projection patterns of Gray code patterns.

Examples of Gray code patterns are shown in FIG. 3. Each rectangular shape shows the area of a projected pattern image. The white portions are illuminated portions and the black portions are non-illuminated portions, with the projected patterns being stripe patterns formed by bright/dark contrast. Sequentially irradiating vertical stripe patterns and sequentially illuminating horizontal stripe patterns result in respective pixel values having independent black and white pattern sequences. Checking the coordinate values of projected pattern images against the pattern sequences actually illuminated on the surface of the measurement object enables correspondences to be found with the positions of the projected pattern images.

In S1060, the pattern projection unit 310 projects the patterns generated by the pattern generating unit 300 at S1050 onto the measurement object using an illumination apparatus. The pattern projection unit 310 projects projection pattern images generated by the pattern generating unit 300 onto the measurement object using illumination light. A liquid crystal projector can be used to project illumination light. Projection pattern images may also be projected using illumination and a digital micro-mirror device (DMD), which is a semiconductor integrating tiny movable mirrors. Alternatively, projection patterns may be generated using projection in combination with a device that dynamically polarizes a laser light source.

In S1070, an imaging unit 400 captures projection images of the patterns projected onto the measurement object in the measurement space, using an imaging device and a lens. A CCD or CMOS type photoelectric conversion device is generally used as the imaging device. As for the lens, a lens that has been corrected for distortion can be used. Captured images obtained by the imaging unit 400 may be temporarily held using a recording device such as RAM or nonvolatile memory, an external recording apparatus such as a hard disk or a silicon disk, or the like.

In S1080, a projection position calculation unit 810 derives by calculation the projection image coordinates at which the pattern on the surface of the geometric model held in the geometric model holding unit 110 is projected onto the imaging surface of the imaging unit 400. Here, the projection position calculation unit 810 derives the projection image coordinates from the correspondence between the coarse position and orientation held in the coarse position/orientation holding unit 210 and the positions of the pattern images generated at S1050. More specifically, the projection position calculation unit 810 computes the relationship between coordinate values on pattern images generated by the pattern generating unit 300 and projected positions (projection image coordinates) on a captured image obtained by the imaging unit 400, using a model of the surface of the measurement object held by the geometric model holding unit 110 and the position and orientation in the work space held by the coarse position/orientation holding unit 210.

Figure 4:
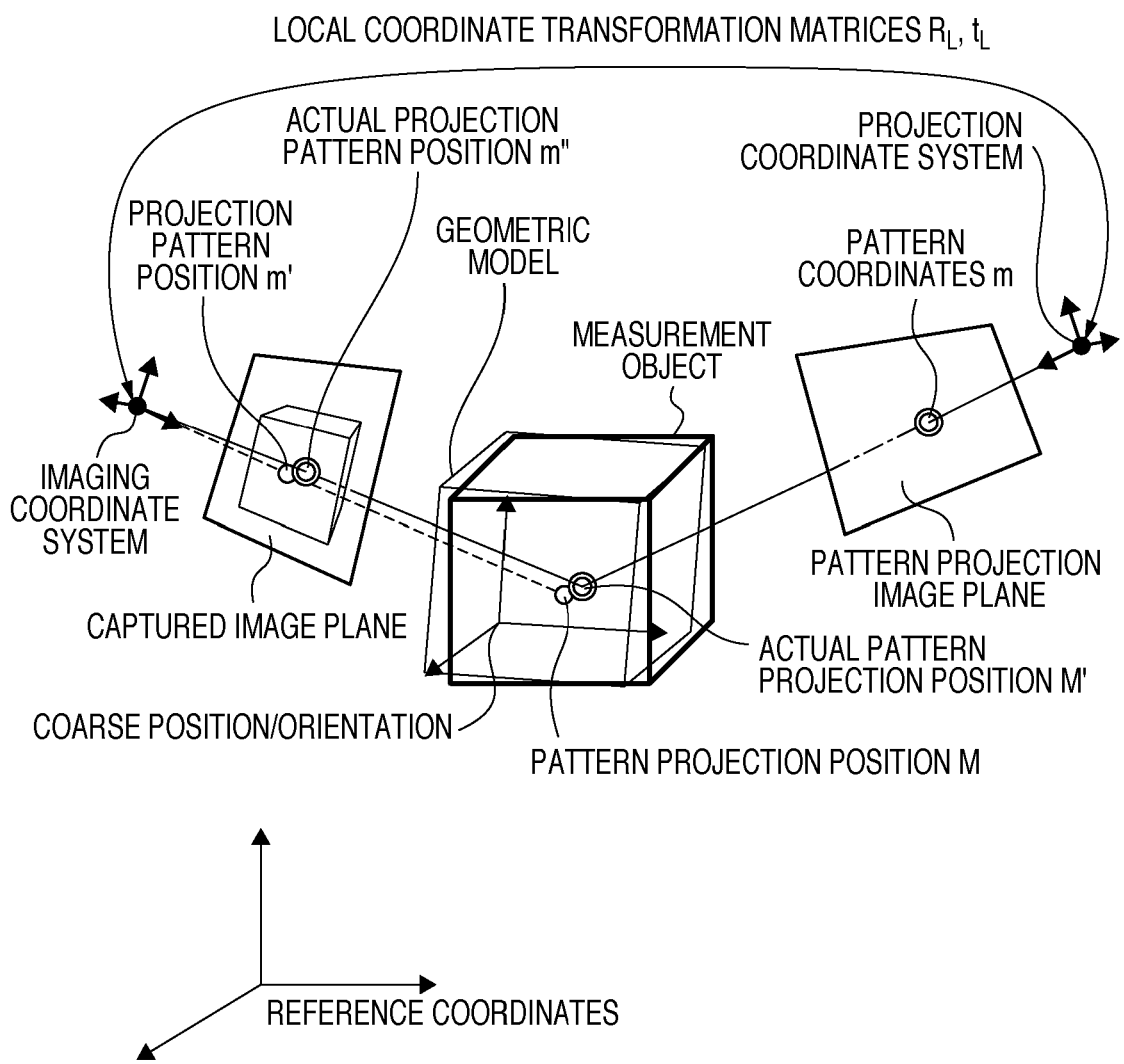
FIG. 4 illustrates the content of a projection position calculation unit according to the First Embodiment.

FIG. 4 is a diagram schematically showing the relationship between pattern projection and the measurement object during imaging. Hereinafter, processing by the projection position calculation unit 810 will be described using FIG. 4. Firstly, a normalized virtual projection image plane at focal length f=1 is set, assuming that the projection illumination system of the pattern projection unit 310 performs pattern projection from an ideal point light source, with this plane being referred to as the pattern projection image plane. When the pattern generating unit 300 has written a pattern onto the pattern projection image plane, the pattern projection unit 310 projects pattern illumination onto the measurement object using devices such as actual illumination and a lens. In reality, lens distortion during projection or distortion in the projected image due to an ideal point light source not being used may occur, but the influence of such distortion can be reduced by performing optical correction beforehand or by correcting the pattern image.

Let $m=[u, v, 1]^T$ be the coordinates of a given pattern on the pattern projection image plane. The coordinate system at the projection center relative to the reference coordinate system of the measurement space is defined as the projection coordinate system, and rotation of this coordinate system is represented using six degrees of freedom consisting of three rotations and three translations. Rotation R may be represented using any of Euler angles, roll, pitch and yoke, rotation axis/rotation angle, four dimensional numbers or the like. Here, a 3×3 rotation matrix R obtained from the rotation representation is used. A 3×1 matrix $t=[t_x, t_y, t_z]^T$ consisting of the three components $t_x$, $t_y$, $t_z$ is used for translation.

Assume that the pattern light projected onto the surface of the measurement object is projected onto a pattern projection position $M=[X, Y, Z]^T$ in the reference coordinate system. When it is assumed that the pattern projection position M exists on a straight line passing from the light source through pattern coordinates m on the pattern projection image plane, the point M on the light beam can be expressed by the following equation.

$$M = \begin{bmatrix} X \\ Y \\ Z \end{bmatrix} = t + \lambda \frac{Rm - t}{\|Rm - t\|} = \begin{bmatrix} t_x \\ t_y \\ t_z \end{bmatrix} + \quad (1)$$

$$\lambda \frac{\begin{bmatrix} uR_{11} + vR_{12} + R_{13} - t_x \\ uR_{21} + vR_{22} + R_{23} - t_y \\ uR_{31} + vR_{32} + R_{33} - t_z \end{bmatrix}}{\left\| \begin{bmatrix} uR_{11} + vR_{12} + R_{13} - t_x \\ uR_{21} + vR_{22} + R_{23} - t_y \\ uR_{31} + vR_{32} + R_{33} - t_z \end{bmatrix} \right\|} = \begin{bmatrix} t_x \\ t_y \\ t_z \end{bmatrix} + \lambda \begin{bmatrix} L_x \\ L_y \\ L_z \end{bmatrix}$$

Here, $\lambda$ is a positive value serving as a scale for the direction vector of the straight line. The components of the direction vector of the straight line are given as $L=[L_x, L_y, L_z]^T$ for simplicity.

Next, the point of intersection between the straight line of equation (1) and the surface of the geometric model of the measurement object is derived, and taken as the projection position M on the geometric model surface. Here, it is determined whether each of N triangular patches held in the geometric model holding unit 110 intersect the straight line of equation (1). Let $P_{ij}=[px_{ij}, py_{ij}, pz_{ij}]^T$ be the jth vertex coordinates of an ith triangular patch of the geometric model. The geometric model transforms vertex coordinates $P'_{ij}$ of the reference coordinate system in the measurement space as shown in the following equation (2), using rotation $R_m$ and translation $t_m$ constituting the position and orientation of the geometric model held by the coarse position/orientation holding unit 210.

$$P'_{ij} = R_m P_{ij} + t_m = \begin{bmatrix} R_{m11} & R_{m12} & R_{m13} \\ R_{m21} & R_{m22} & R_{m23} \\ R_{m31} & R_{m32} & R_{m33} \end{bmatrix} \begin{bmatrix} px_{ij} \\ py_{ij} \\ pz_{ij} \end{bmatrix} + \begin{bmatrix} t_x \\ t_y \\ t_z \end{bmatrix} \quad (2)$$

The orientation of planes of the triangular patches is assumed to be registered using a geometric model. A normal vector $n'_i$ of the ith triangular patch in the measurement space is obtained by multiplying a normal vector $n_i$ of the triangular patch held in the geometric model by the rotation $R_m$.

The line segment connecting the intersection point $Pc_i$ between the vertex $P'_{ij}$ and the straight line intersects the normal vector $n'_i$ of the ith triangular patch, giving $$(Pc_i - P'_{i0}) \cdot n'_i = 0 \quad (3)$$

from the relationship of inner products. Substituting in equation (1) gives equation (4).

$$(t + \lambda L - P'_{i0}) \cdot n'_i = 0 \quad (4)$$

Further, solving equation (4) for λ gives equation (5).

$$\lambda = \frac{(P'_{i0} - t) \cdot n'_i}{L \cdot n'_i} \quad (5)$$

Substituting this equation into equation (1) and solving for the coordinates of the intersection point $Pc_i$ gives the following equation.

$$Pc_i = t + \frac{(P'_{i0} - t) \cdot n'_i}{L \cdot n'_i} L \quad (6)$$

To check whether the intersection point $Pc_i$ lies inside the triangular patch, outer products of the triangle vertices and the intersection point $Pc_i$ are computed, and if their respective orientations are the same as the normal vector $n'_i$, the intersection point $Pc_i$ lies inside the triangular patch. Specifically, the intersection point lies inside the triangle if the following three equations are all positive.

$$\{(P'_{i0} - Pc_i) \times (P'_{i1} - Pc_i)\} \cdot n'_i$$

$$\{(P'_{i1} - Pc_i) \times (P'_{i2} - Pc_i)\} \cdot n'_i$$

$$\{(P'_{i2} - Pc_i) \times (P'_{i0} - Pc_i)\} \cdot n'_i \quad (7)$$

Further, since there may be multiple intersection points of the geometric model with the patches, the intersection point of the triangular patch closest to the origin of the projection coordinate system needs to be derived. The intersection point closest in distance to the origin of the projection coordinate system can be derived from patches having an intersection point among the N triangular patches, where λ>0, and this intersection point can be taken as the pattern projection position M.

$$M = \underset{i}{\mathrm{argmin}}(\|t - Pc_i\|) \quad (\lambda > 0) \quad (8)$$

The intersection point of the surface of the geometric model with a triangular patch obtained by equation (8) is the estimated projection point on the surface of the geometric model.

Next, assume that the imaging unit 400 is imaging a pattern on the measurement object surface. The imaging system of the imaging unit is taken as the perspective projection model of the camera. Let f' be the focal length to the projection image plane. Further, assume that the projection position M of the pattern projected onto the surface of the measurement object is projected onto the captured image. Let $m'=[u', v', 1]^T$ be the projection pattern position on the captured image. When the lens center of the imaging camera is represented by six degrees of rotational and translational freedom in the reference coordinate system, and the rotations and translations are respectively represented as the matrices R' and t', the following equation (9) holds true from the perspective projection relationship.

$$s' \begin{bmatrix} u' \\ v' \\ 1 \end{bmatrix} = \begin{bmatrix} f' & 0 & 0 & 0 \\ 0 & f' & 0 & 0 \\ 0 & 0 & 1 & 0 \end{bmatrix} \begin{bmatrix} R'_{11} & R'_{12} & R'_{13} & t'_x \\ R'_{21} & R'_{22} & R'_{23} & t'_y \\ R'_{31} & R'_{32} & R'_{33} & t'_z \\ 0 & 0 & 0 & 1 \end{bmatrix} \begin{bmatrix} X \\ Y \\ Z \\ 1 \end{bmatrix} \quad (9)$$

Note that s' is the scalar value of the scale element.

Here, assume that the lens coordinate system of the pattern projection unit 310 and the coordinate system of the imaging unit 400 are fixed, and that local coordinate transformation thereof has been derived by a correction procedure. More specifically, correction can be performed by imaging a plurality of indices and using least squares with the coordinate values of the plurality of correction indices, or by another method. The following relationship holds, where $R_L$ and $t_L$ are the local coordinate transformation matrices.

$$\begin{bmatrix} R' & t' \\ 0_{1\times 3} & 1 \end{bmatrix} = \begin{bmatrix} R_L & t_L \\ 0_{1\times 3} & 1 \end{bmatrix} \begin{bmatrix} R & t \\ 0_{1\times 3} & 1 \end{bmatrix} \quad (10)$$

Substituting equation (10) and the pattern projection position M on the geometric model surface obtained by equation (8) into equation (9) gives a projection pattern position m' on the captured image.

$$s'm' = s' \begin{bmatrix} u' \\ v' \\ 1 \end{bmatrix} = \begin{bmatrix} f' & 0 & 0 & 0 \\ 0 & f' & 0 & 0 \\ 0 & 0 & 1 & 0 \end{bmatrix} \begin{bmatrix} R_L & t_L \\ 0_{1\times 3} & 1 \end{bmatrix} \begin{bmatrix} R & t \\ 0_{1\times 3} & 1 \end{bmatrix} \begin{bmatrix} X \\ Y \\ Z \\ 1 \end{bmatrix} \quad (11)$$

When the position and orientation of the measurement object 10 match the position and orientation held in the coarse position/orientation holding unit 210, the projection pattern position m' on the captured image will match the coordinate values at the time when the actual projection pattern projected by the illumination apparatus is captured. In the case where the coarse position and orientation differ slightly from the position and orientation of the measurement object 10, the actual projection pattern will be in an on-screen area in the neighborhood of the projection pattern position m' computed by the projection position calculation unit 810. In view of this, the projection position calculation unit 810 specifies the range of the illumination area to a distance calculation unit 600. The distance calculation unit 600 enables pattern correspondence by executing a pattern search in the specified range of the illumination area, that is, in the neighborhood of the computed projection pattern position m'.

Returning to FIG. 2, in S1090, the distance calculation unit 600 searches for corresponding patterns in the neighborhood of the pixel of the pattern projection image coordinates estimated at S1080 from the captured image obtained by imaging in S1070. The distance between each pattern and the imaging unit 400 is calculated by stereo measurement of the projection system and the imaging system. That is, the distance calculation unit 600 matches a pattern projected onto the measurement object acquired by the imaging unit 400 (captured pattern) with a pattern projected by the pattern projection unit 310, and derives the correspondence between the position of the projection pattern image and the position of the captured image. The above distances are then derived from this correspondence. Here, processing speed improves, since the range of the checking area in which the distance calculation unit 600 searches for corresponding patterns is limited by the calculation result of the projection position calculation unit 810 as discussed above.

Note that in the case of using Gray code patterns, the position of a projection pattern image can be determined by regarding the patterns projected in black and white as bits, and checking the encoded values of the bits against the encoded values at the time of pattern generation.

The local coordinate transformation matrices of the pattern projection unit 310 and the imaging unit 400 used by the distance calculation unit 600 are assumed to have been defined by a prior correction procedure. Thus, distances in the imaging coordinate system can be computed by stereo measurement, using the coordinate values of a projected pattern and a captured pattern that correspond to each other.

Meanwhile, a position/orientation calculation unit 700 estimates the position and orientation of the measurement object 10 using the distances derived by the distance calculation unit 600 and the geometric model held in the geometric model holding unit 110, and updates the information on the coarse position and orientation held in the coarse position/orientation holding unit 210. This processing will now be described. Firstly, a pattern actually illuminated is captured, and the position of the actual projection pattern on the captured image is taken as an actual projection pattern position m". The relationship between the pattern position m, the local coordinate transformation matrices $R_L$ and $t_L$, and the actual pattern projection position M' is shown in the following equation (12).

$$\begin{bmatrix} uR_{31} - R_{11} & uR_{32} - R_{12} & uR_{33} - R_{13} \\ vR_{31} - R_{21} & vR_{32} - R_{22} & vR_{33} - R_{23} \\ u''R'_{31} - R'_{11} & u''R'_{32} - R'_{12} & u''R'_{33} - R'_{13} \\ v''R'_{31} - R'_{21} & v''R'_{32} - R'_{22} & v''R'_{33} - R'_{23} \end{bmatrix} M' = \begin{bmatrix} t_x - ut_z \\ t_y - vt_z \\ t'_x - u''t'_z \\ t'_y - v''t'_z \end{bmatrix} \quad (12)$$

M' can be derived by multiplying both sides of the equation by the generalized inverse matrix of the determinant of the right side.

In S1110, the position/orientation calculation unit 700 performs an estimation calculation of the position and orientation such that the difference between the actual projection pattern position and the computed projection pattern position is reduced. The estimation of position and orientation basically consists of iteratively applying error minimization because of involving a nonlinear calculation for orientation. The estimated values of position and orientation, which are unknown parameters, are updated, such that the sum of the square of the distances between the projection pattern positions computed from the pattern projection positions on the surface of the geometric model and the observed actual projection pattern position is minimized, with the position and orientation of the measurement object to be derived being treated as unknown. Specifically, the position and orientation of a geometric model can be derived from the geometric model and the measurement distance, using the iterative closest point (ICP) method disclosed in Document 2 or the method disclosed in Document 3. At this time, values held by the coarse position/orientation holding unit 210 can be used as initial values.

Note that in the projection position calculation unit 810, the results of distance measurement on other objects, the background area or the like cannot be included, since only patterns in which there is a relationship between the projection and imaging of the geometric model can be used. Thus, robust position and orientation calculation can be performed, since there are no exception values apart from the geometric model in the position/orientation calculation unit 700.

Also, the position/orientation calculation unit 700 determines whether to continue iterating the optimization calculation based on the residual error resulting from the iteration calculation (difference between the actual projection pattern position and the projection pattern position computed by the projection position calculation unit 810 using the updated coarse position and orientation). Threshold values for this determination may be set by the user or may be set using the relationship between the size of the observation area in the work space and the distance to the imaging apparatus. Further, the three-dimensional measurement apparatus 1000 may hold preset values, and these values may be read out and set as threshold values.

The residual error value is compared with a threshold value set by some method, although in reality the residual value after calculation may not decrease. Thus, in the present embodiment, the iteration frequency is held and the trend in the residual error per iteration is calculated, and if the iteration frequency exceeds a preset frequency or if the residual error exhibits an increasing trend, iteration of the optimization calculation by the position/orientation calculation unit 700 is terminated. It can thereby be determined whether or not the optimization calculation of position and orientation is proceeding favorably.

Figure 5:
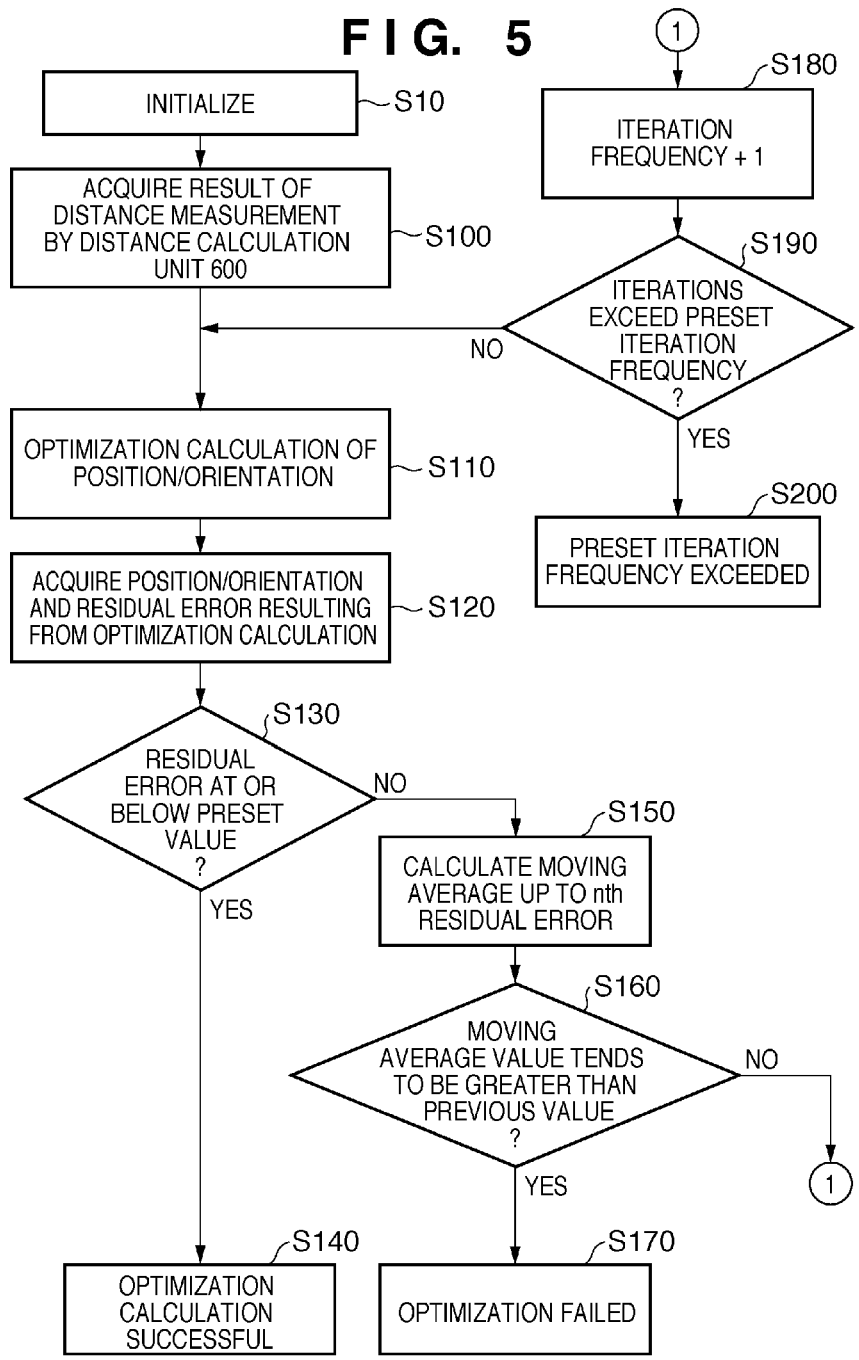
FIG. 5 is a flowchart showing processing by the projection position calculation unit according to the First Embodiment.

Processing by the position/orientation calculation unit 700 will be described using FIG. 5. Firstly, in S10, the position/orientation calculation unit 700 sets the calculation iteration frequency to 0, and initializes the moving average value. In S100, the position/orientation calculation unit 700 obtains the result of the distance calculation by the distance calculation unit 600. In S110, the position/orientation calculation unit 700 performs an optimization calculation of the position and orientation of the measurement object 10, and updates the parameters. In S120, the position/orientation calculation unit 700 acquires the updated position and orientation values and the residual error. In S130, the position/orientation calculation unit 700 judges whether the residual error acquired at S120 is at or below a preset threshold value. If the residual error is at or below the threshold value, the position/orientation calculation unit 700 sets a flag indicating that the optimization calculation was successful in S140, having determined that the position and orientation estimation result was sufficiently accurate, and terminates the iteration. If the residual error exceeds the threshold value in S130, the position/orientation calculation unit 700 shifts the processing to S150, due to the position and orientation estimation being insufficiently accurate.

In S150, the position/orientation calculation unit 700 calculates the moving average of residual errors, in order to calculate the trend as to whether the residual error is decreasing or increasing. The number of frames n of the moving average may be designated by the user, or an empirically derived value may be set. If the tendency, in S160, is for the moving average value to increase relative to the previously calculated moving average value, the position/orientation calculation unit 700 sets a flag indicating that optimization failed in S170, having determined that the error minimization calculation of the optimization calculation is diverging, and terminates the iteration. If, in S160, the residual value has decreased as a result of the iteration, the position/orientation calculation unit 700 shifts the processing to S180, having determined that the iteration calculation needs to be performed again. In S180, the position/orientation calculation unit 700 adds 1 to the value of the overall iteration frequency being held. Next, in S190, the position/orientation calculation unit 700 determines whether the iteration frequency has exceeded the preset frequency. If the iteration frequency is within the preset frequency, the position/orientation calculation unit 700 returns the processing to S110 in order to execute the iterative optimization calculation again. On the other hand, if it is determined that the preset frequency has been exceeded, the position/orientation calculation unit 700, in S200, sets a flag indicating that the preset iteration frequency has been exceeded, and terminates the iteration.

Returning to FIG. 2, the position/orientation calculation unit 700, in S1130, updates the values held by the coarse position/orientation holding unit 210 using the estimated position and orientation result. In the case where the three-dimensional measurement apparatus 1000 successively measures the position and orientation of the measurement object 10, position and orientation estimation of the measurement object between successive frames is enabled by updating the values held by the coarse position/orientation holding unit 210 with the result of position and orientation estimation by the position/orientation calculation unit 700.

In S1120, the pattern generating unit 300 updates the parameters used in the projection pattern generation of S1050, according to the state of the position and orientation estimation by the position/orientation calculation unit 700 in S1110. Specifically, the flag set at S140, S170 or S200 is used to indicate the estimation state. If the estimation state is favorable (e.g., if the optimization calculation successful flag is set), projection control is performed to reduce the projection/imaging frequency, and if the estimation state is unfavorable (e.g., if the optimization failure flag is set), projection control is performed to increase the projection/imaging frequency. That is, control is performed with a projection control function (S1120) of the pattern generating unit 300, so as to decrease the number of projected images of Gray code patterns if the estimation result indicated by the estimation state is favorable, and to increase the number of projected images of Gray code patterns if the estimation result indicated by the estimation state is unfavorable.

Further, the projection control function of the pattern generating unit 300 alters the spacing of the stripes of projected patterns according to changes in the position and orientation of the measurement object 10 indicated by information held in the coarse position/orientation holding unit 210. That is, the pattern generating unit 300 performs control so as to increase the spacing in projected patterns when the change in position and orientation is large, and to decrease the spacing in patterns when the change is small. Note that a change in the position and orientation of the measurement object 10 indicated by information held in the coarse position/orientation holding unit 210 reflects the movement of one or both of the measurement object 10 and the three-dimensional measurement apparatus 1000.

Figure 6:
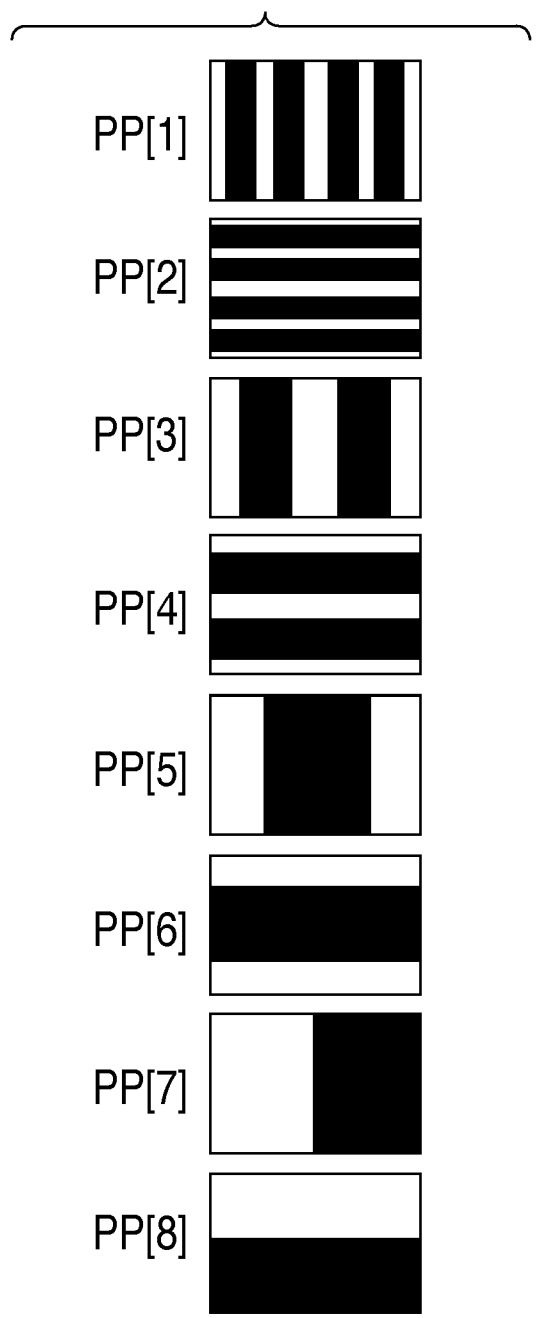
FIG. 6 shows example projection pattern images according to the First Embodiment.

A projected pattern image sequence is shown in FIG. 6. PP[n] indicates the nth pattern to be projected. As for this embodiment, the stripes are assumed to be vertical if n is odd and horizontal if n is even. These stripe patterns are formed by bright/dark contrast. The image sequence is held in order from small to large spacing of the stripes in FIG. 3. Projection is performed in order of "n", that is, from small to large spacing of the stripes.

Figure 7:
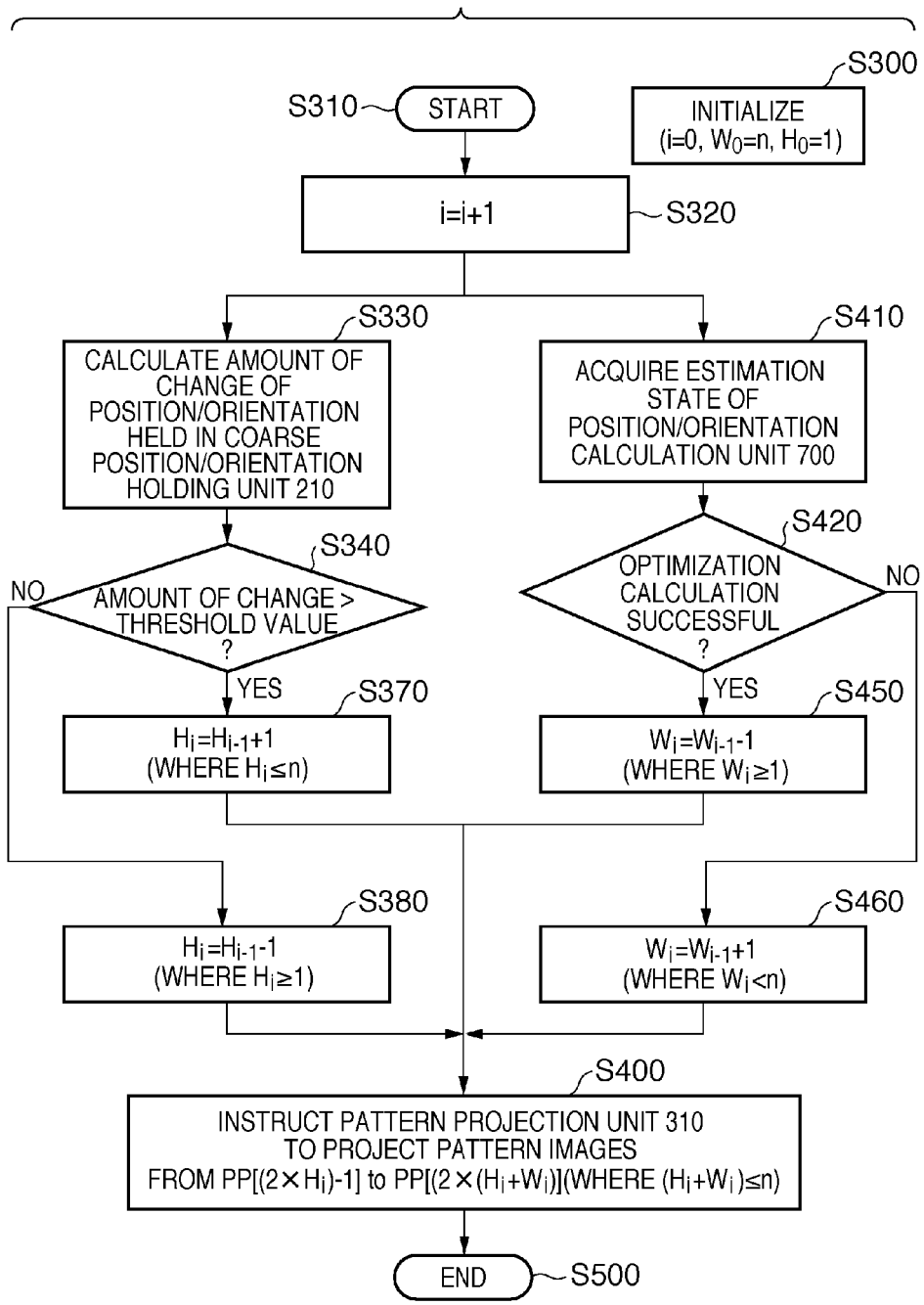
FIG. 7 is a flowchart illustrating a projection control function of a pattern generating unit according to the First Embodiment.

FIG. 7 shows processing by the projection control function of the pattern generating unit 300 according to the First Embodiment. Hereinafter, let 2n be the total number of patterns, and let n be the number of vertical stripe and horizontal stripe pairs. Here, let $W_i$ and $H_i$ be integer values. $W_i$ denotes how many of the PP[n] pattern image pairs are to be projected in the ith projection. If $W_i$ equals n, this denotes that the pattern images of all of the Gray code patterns are to be sequentially projected, which is the normal pattern light projection method using Gray code patterns. $H_i$ denotes the ranking of the pair in the PP[n] pattern image sequence from which the ith projection is to be started. The larger the value of $H_i$, the greater the relative width of the stripes of the patterns from which projection will be sequentially performed. That is, the pattern projection unit 310 irradiates patterns with widened pattern spacing. While the accuracy of the estimated coordinates of pattern projection positions deteriorates when the object and/or apparatus is moving, this configuration enables the distance between adjacent patterns to be widened by increasing the spacing of the projection patterns, and thus obtaining the effect of improved pattern discrimination.

Processing by the projection control function of the pattern generating unit 300 as described above will be described using the flowchart of FIG. 7. Firstly, in S300, the pattern generating unit 300 performs initialization by initializing the variables. Settings can be performed at the one time when the projection control function is enabled. The processing from the start step S310 to the end step S500 is part of the processing by the pattern generating unit 300, and is not the start and end of the entire processing by the pattern generating unit 300. In step S320, the pattern generating unit 300 increments the variable i holding the processing iteration frequency by 1.

In S330, the pattern generating unit 300 computes the amount of change in position and orientation before and after updating, indicated by information held in the coarse position/orientation holding unit 210. For example, if the coarse position/orientation holding unit 210 holds six degrees of freedom parameters, the respective absolute values of the differences between the values of the i−1th coarse position and orientation held and the values of the ith coarse position and orientation held are calculated, and the maximum absolute value is derived from these absolute values as the amount of change. In S340, the pattern generating unit 300 compares the amount of change computed at S330 with a preset threshold value, and advances the processing to S370 if the amount of change is greater than the threshold value, and advances the processing to S380 if the amount of change is less than or equal to the threshold value. At S370, the pattern generating unit 300 adds 1 to the previous value $(H_{i-1})$ of $H_i$, and sets the result as the current value of $H_i$. At 5380, the pattern generating unit 300 sets a value obtained by subtracting 1 from the previous value $(H_{i-1})$ of $H_i$ as the current value of $H_i$. This results in projection using a pattern with large spacing between the stripes being performed if the movement of the object and/or apparatus is large, and projection using a pattern with small spacing between the stripes being performed if the movement is small.

On the other hand, in S410, the pattern generating unit 300 acquires the estimation state of the position/orientation calculation unit 700, and discriminates the estimation state at S420. If the optimization calculation successful flag is on, the processing is moved to S450, and if the optimization calculation successful flag is off (optimization calculation was unsuccessful), the processing is moved to S460. In S450, the pattern generating unit 300 subtracts 1 from the previous value ($W_{i-1}$) of $W_i$, and sets the result as the current value of $W_i$. At S460, the pattern generating unit 300 adds 1 to the previous value ($W_{i-1}$) of $W_i$, and sets the result as the current value of $W_i$. This acts to reduce the number of sets of pattern images to be projected if the optimization calculation is successful, and to increase the number of sets of pattern images to be projected if the optimization calculation is unsuccessful. At step S400, pattern images forming the $W_i$ pairs in order from $PP[(2 \times H_i)-1]$ to $PP[(2 \times (H_i+W_i)-2]$ are specified to the pattern projection unit 310. In the case of $PP[(2 \times (H_i+W_i)-2]$, however, there will be fewer projected patterns than the $W_i$ pairs as $H_i$ increases, because data is only provided up to PP[2n]. In view of this, projection may be started from a higher ranked image than $PP[(2 \times H_i)-1]$ if it is desired to prioritize the number of patterns to be projected.

Basically, if optimization calculation is successful, the estimation of captured image coordinates by the projection position calculation unit 810 will be highly accurate, thus enabling pattern correspondence. In the embodiment illustrated in FIG. 7, the projected number of patterns is given as $W_i$, and the value of $W_i$ is incremented or decremented by 1 at a time, but the increment/decrement value is not limited to 1, and the increment/decrement amount need not be constant.

Note that if the relative motion of the measurement object and the imaging unit 400 is large, the difference between the projection pattern position estimated by the projection position calculation unit 810 and the actual projection pattern position will be large. However, the difference value is affected by the value in the depth direction. In view of this, the pattern search area can be altered according to the distance in the depth direction. The threshold values of the orientation component and the translational component parameters out of the coarse position and orientation parameters may also be compared separately.

According to the present embodiment, as shown above, the projection control function of the pattern generating unit 300 enables the projection frequency to be reduced if the estimation state is favorable, since the projection pattern frequency and the measurement point are adaptively increased or decreased according to the estimation state of the position/orientation calculation unit 700. Thus, the overall measurement time can be shortened. That is, according to the present embodiment, the projection/imaging frequency for space codes can be reduced by estimating the position of a pattern to be projected on a captured image from a geometric model and the coarse position and orientation, thus allowing the anticipation of an increase in processing speed.

The function of S1120 is realized by the projection control function of the pattern generating unit 300. In step S1140, a position/orientation output unit 900 outputs the position and orientation estimation result 20 obtained at S1110 to an external destination. The output information may be six degrees of freedom values indicating the position and orientation of the measurement object 10 in the reference coordinate system of the work space, or may be positions and orientations including the position and orientation of the origin of the imaging coordinate system in the coordinate system of the imaging unit 400.

Note that with the three-dimensional measurement apparatus 1000 serving as one embodiment of the present invention, stand-alone apparatuses may be used. For example, a commercially available liquid crystal projector can be used for the pattern projection unit 310. A commercially available camera and lens can be used for the imaging unit 400. Also, the three-dimensional measurement apparatus 1000 can be constituted by a mechanism for outputting signals usable by respective apparatuses and an input/output portion for receiving actual signals. This enables the apparatus to be extended for use according to the application of the user and the measurement range.

Second Embodiment

Figure 8:
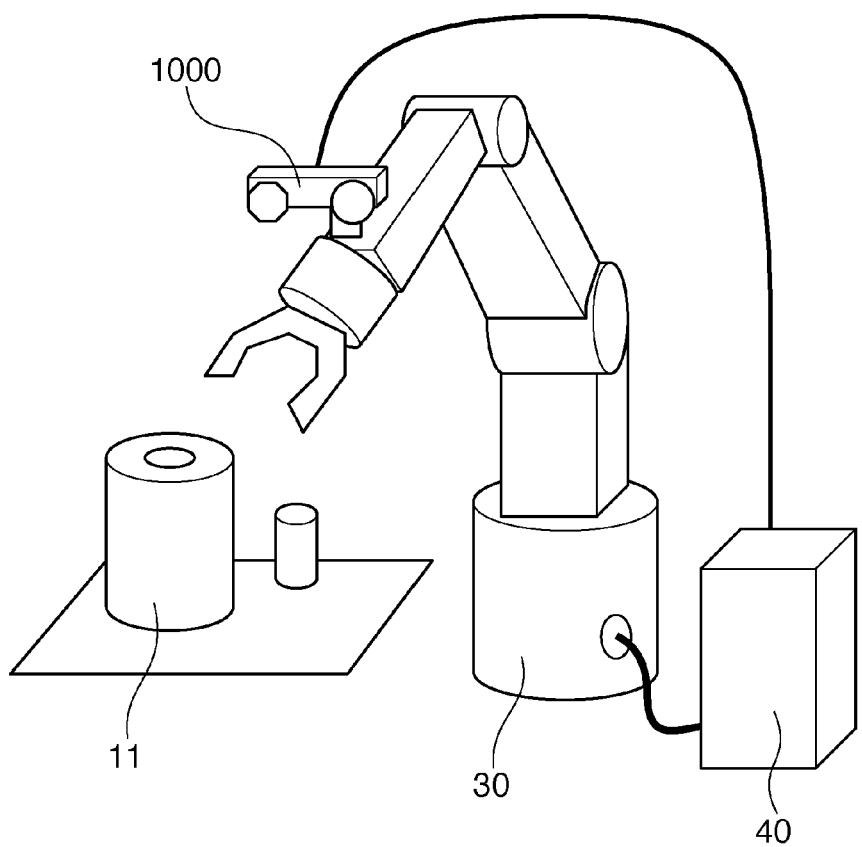
FIG. 8 shows a state in which a three-dimensional measurement apparatus is mounted on an industrial robot arm in a Second Embodiment.

As for a suitable application example of the three-dimensional measurement apparatus 1000 described in the First Embodiment, an example is given in which the apparatus is installed on the end effector of an industrial robot arm, and used for the purpose of measuring the position and orientation of an object to be gripped serving as a measurement object. Hereinafter, this application example of the three-dimensional measurement apparatus 1000 will be described using FIG. 8.

An industrial robot arm 30 is driven under the control of a robot controller 40. The three-dimensional measurement apparatus 1000 serving as one embodiment of the present invention is fixed by a jig to an arm portion. The operation of the industrial robot arm 30 involves picking up an object 11 using a gripper. The three-dimensional measurement apparatus 1000 is connected by a cable in order to sequentially estimate the relative position and orientation of the gripper and the object 11, and convey the estimation results as control parameters of the robot controller 40.

Values obtained by adding an offset for the jig to an attachment position on the industrial robot arm 30 controlled by the robot controller 40 are conveyed to the coarse position/orientation input unit 200 in the three-dimensional measurement apparatus 1000. Also, a geometric model obtained by converting a CAD model of the object 11 into a format readable by the present apparatus 1000 is input to the geometric model input unit 100. Note that in the case where the object changes, a corresponding geometric model is input to the geometric model input unit 100 whenever a change occurs, enabling the present apparatus to handle multiple types of objects. A selection may be made from geometric models held by the apparatus beforehand, or geometric models held by the apparatus may be switched using the result of component recognition by a separate component discrimination apparatus.

If the position and orientation of the object 11 obtained by inputting the coarse position and orientation in the three-dimensional measurement apparatus 1000 differ from its actual placement in the work space, the position and orientation estimation by the position/orientation calculation unit 700 will result in a large residual error. The pattern generating unit 300 increases the projection/imaging frequency in response. Measurement of the distance to and position/orientation of the measurement object is thereby enabled. If highly accurate position and orientation are obtained at the one time, this is reflected in the coarse position/orientation holding unit 210.

Further, assume that an operation for moving the end effector of the industrial robot arm 30 closer to the object 11 is performed. The absolute positional accuracy of the end effector position of the implemented robot arm in the work space obtained by an encoder is often not that high, due to noise in the encoder values of the joint angles, flexing of the robot under its own weight, and the like. Positions of the end effector of the robot in motion are input to the coarse position/orientation input unit 200. The three-dimensional measurement apparatus 1000 performs pattern projection and imaging for measurement, and outputs the result of position and orientation estimation. In this case, the main focus is on compensating for calculation errors in the robot end effector position calculation. Thus, the estimation state of the position/orientation calculation unit 700 will indicate that the optimization calculation was successful. In view of this, the pattern generating unit 300 performs projection control for reducing the projection/imaging frequency. This results in an increase in imaging frequency when estimating the initial coarse position and orientation, but if highly accurate position and orientation are obtained, the imaging frequency for subsequent measurement is reduced, resulting in reduced projection/imaging frequency and shortened measurement time when successive measurement is performed.

Third Embodiment

With the present invention, even in the case where the geometric model of the measurement object is unknown, the three-dimensional shape of the measurement object can basically be acquired using an apparatus configuration according to one embodiment of the present invention. The applicable range of the present invention can be further broadened by adding a procedure for acquiring an unknown geometric model of a measurement object, using images from multiple views.

Figure 9:
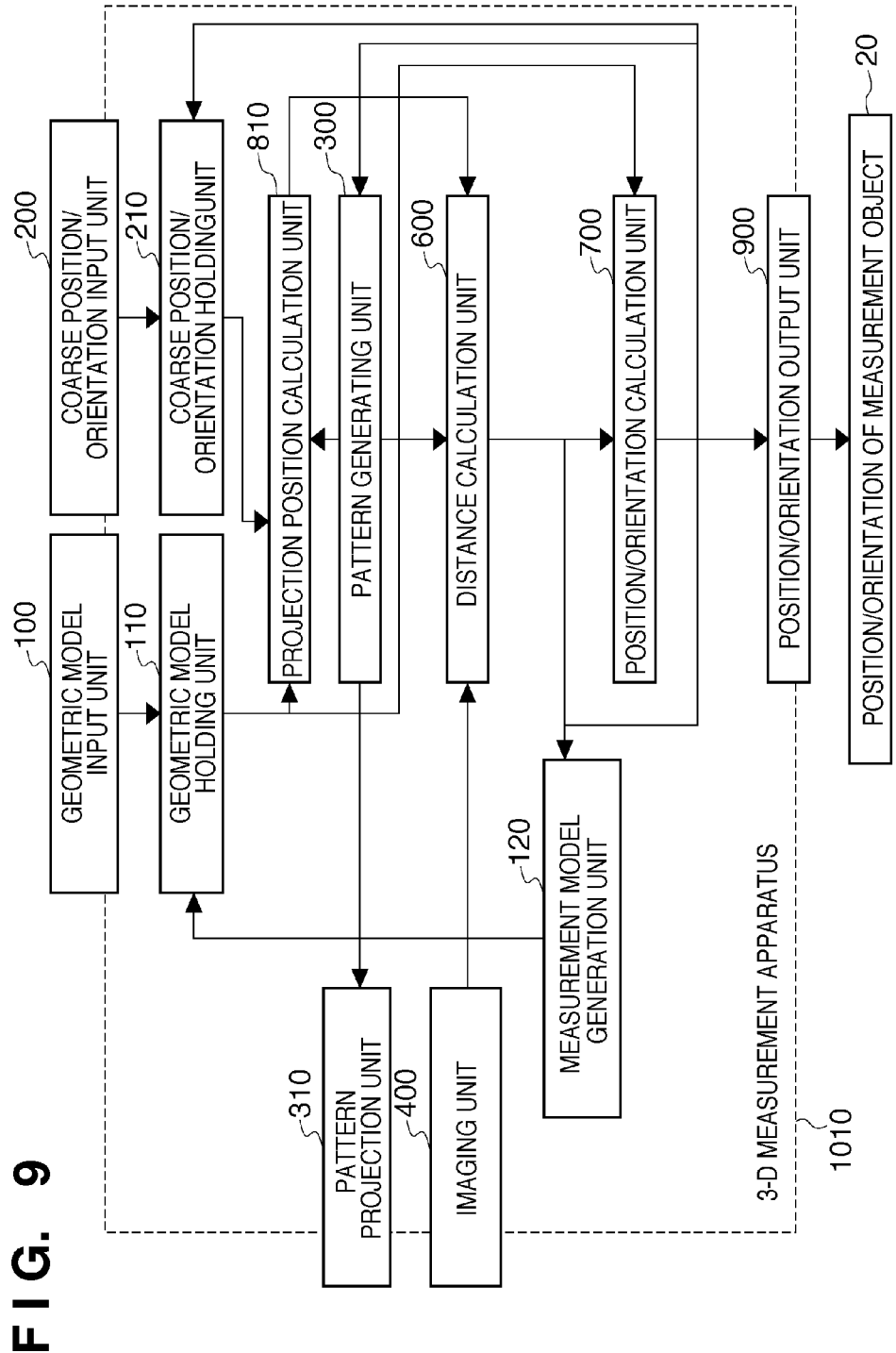
FIG. 9 is a block diagram showing an example configuration of a three-dimensional measurement apparatus according to a Third Embodiment.
Figure 10:
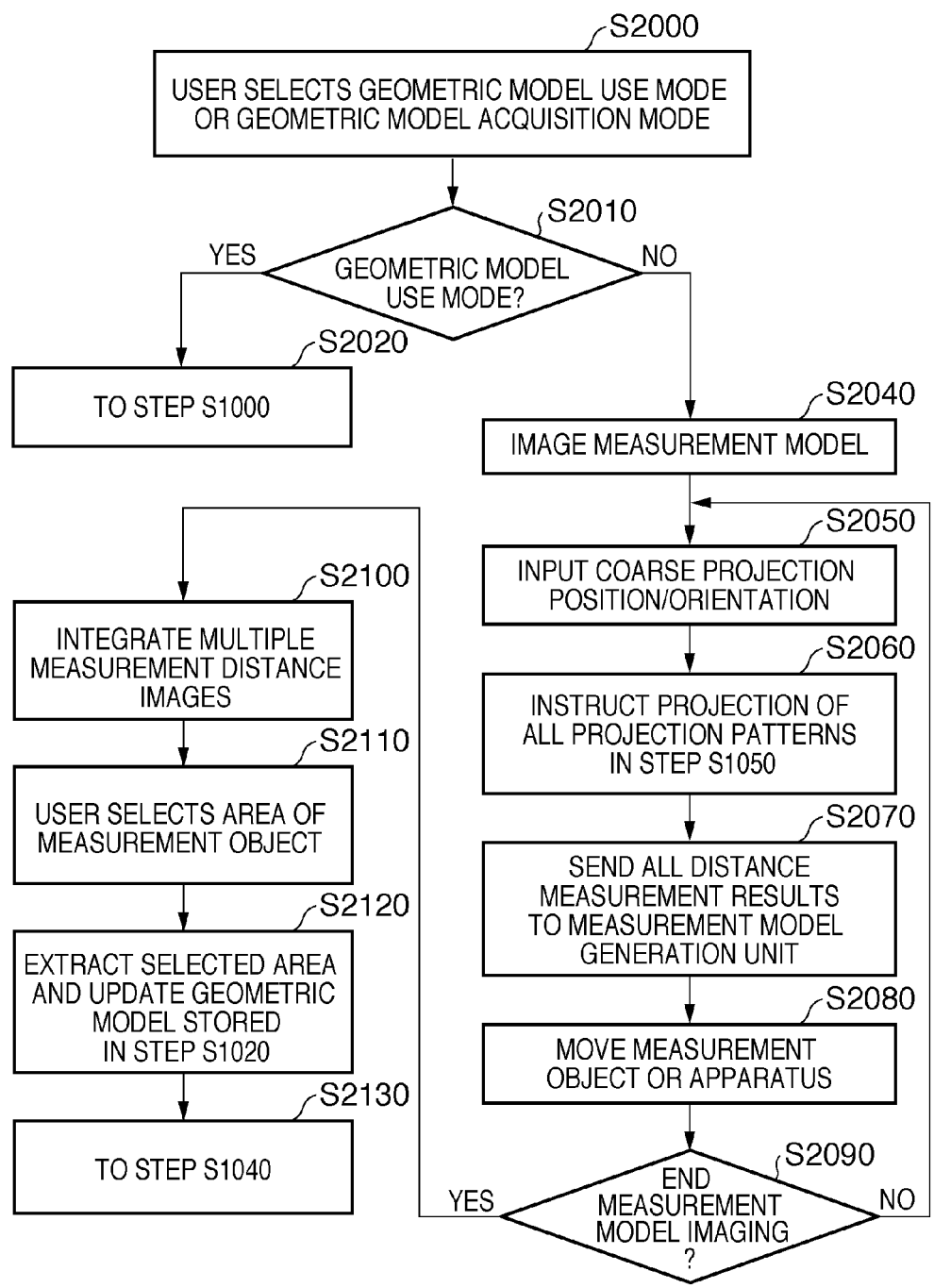
FIG. 10 is a flowchart showing processing by a geometric integration unit according to the Third Embodiment.

FIG. 9 is a block diagram showing an example configuration of a three-dimensional measurement apparatus 1010 according to the Third Embodiment. The three-dimensional measurement apparatus 1010 is constituted by adding a measurement model generation unit 120 to the configuration of the three-dimensional measurement apparatus 1000 of the First Embodiment. The measurement model generation unit 120 exhibits the function thereof when the present apparatus is applied to a model having no geometric model. Hereinafter, the operation of the three-dimensional measurement apparatus 1010 will be described using the flowchart of FIG. 10.

In S2000, the three-dimensional measurement apparatus 1010 prompts the user to select a geometric model use mode or a geometric model acquisition mode. Selection can be performed using a button or a switch. In S2010, the three-dimensional measurement apparatus 1010 discriminates the user input and determines whether the selected mode is the geometric model use mode. If YES (geometric model use mode), the processing proceeds to S2020. At S2020, position and orientation measurement using an existing geometric model registered in the geometric model holding unit 110 or input by the geometric model input unit 100 is executed. That is, position and orientation measurement of the measurement object is performed by the abovementioned processing from S1000 in FIG. 2. On the other hand, if NO at S2010 (geometric model acquisition mode), the processing proceeds to S2040, and measurement model imaging is started under the control of the measurement model generation unit 120. Note that initially the content of the coarse position/orientation holding unit 210 and the state of the position/orientation calculation unit 700 are set so as be based on the position and orientation obtained when model imaging was first performed.

In S2050, the measurement model generation unit 120 acquires the coarse position and orientation of the measurement object (content of the coarse position/orientation holding unit 210). For example, if the measurement object is set on a rotating plate, position and orientation calculated from the rotation angle of the rotating plate can be acquired. Also, in the case where the present measurement apparatus is installed on an arm portion of an industrial robot arm as discussed in the Second Embodiment, the end effector position of the robot can be acquired. Next, in S2060, the measurement model generation unit 120 instructs the pattern generating unit 300 to project all of the projection patterns for distance measurement. In S2070, the distance calculation unit 600 sends all of the distance measurement results to the measurement model generation unit 120.

Because a geometric model is obtained by integrating the distance data to the surface of the measurement object observed from multiple views, the measurement model generation unit 120, in S2080, moves the measurement object 10 or the three-dimensional measurement apparatus 1010 itself. Note that the amount of movement at this time is assumed to be known. In S2090, the measurement model generation unit 120 judges whether to end measurement model imaging. It may be judged to end the measurement model imaging if model imaging has been performed a preset number of times or based on a user instruction, for instance. A plurality of distance data is obtained by distance measurement performed by disposing the three-dimensional measurement apparatus 1010 (pattern projection unit 310, imaging unit 400) and the measurement object in multiple known positional relationships. If it is determined to end measurement model imaging, the processing proceeds to S2100. If it is not determined to end measurement model imaging, the processing goes back to S2050.

In S2100, the measurement model generation unit 120 integrates the plurality of measurement distance images provided by the distance calculation unit 600. The measurement distance images may, for example, be integrated by performing error minimization using the coarse position and orientation, such that the geometric distance between overlapping areas of distance point sets is minimized. In S2110, the measurement model generation unit 120 prompts the user to select an area of the measurement object from the integrated set of measurement points. For example, an integrated distance image can be displayed so as to be visible to the user, and the user can be prompted to designate an area with a mouse or the like. Since it is the user who actually defines the measurement object, it is desirable to have the user select an area.

In S2120, the measurement model generation unit 120 extracts the area selected at S2110 from the integrated set of distance points, converts the extracted area into a geometric model, and registers the geometric model. A triangular patch serving as the geometric model can be generated from a point set using a matching cube method or the like. In S2130, the geometric model generated by the measurement model generation unit 120 is stored in the geometric model holding unit 110, and the processing from S1040 shown in FIG. 2 is performed to start similar position and orientation measurement to the First Embodiment.

By using the three-dimensional measurement apparatus 1010 having the abovementioned measurement model generation unit 120, the present apparatus can also be used in the case where a geometric model cannot be provided beforehand.

Fourth Embodiment

Figure 11:
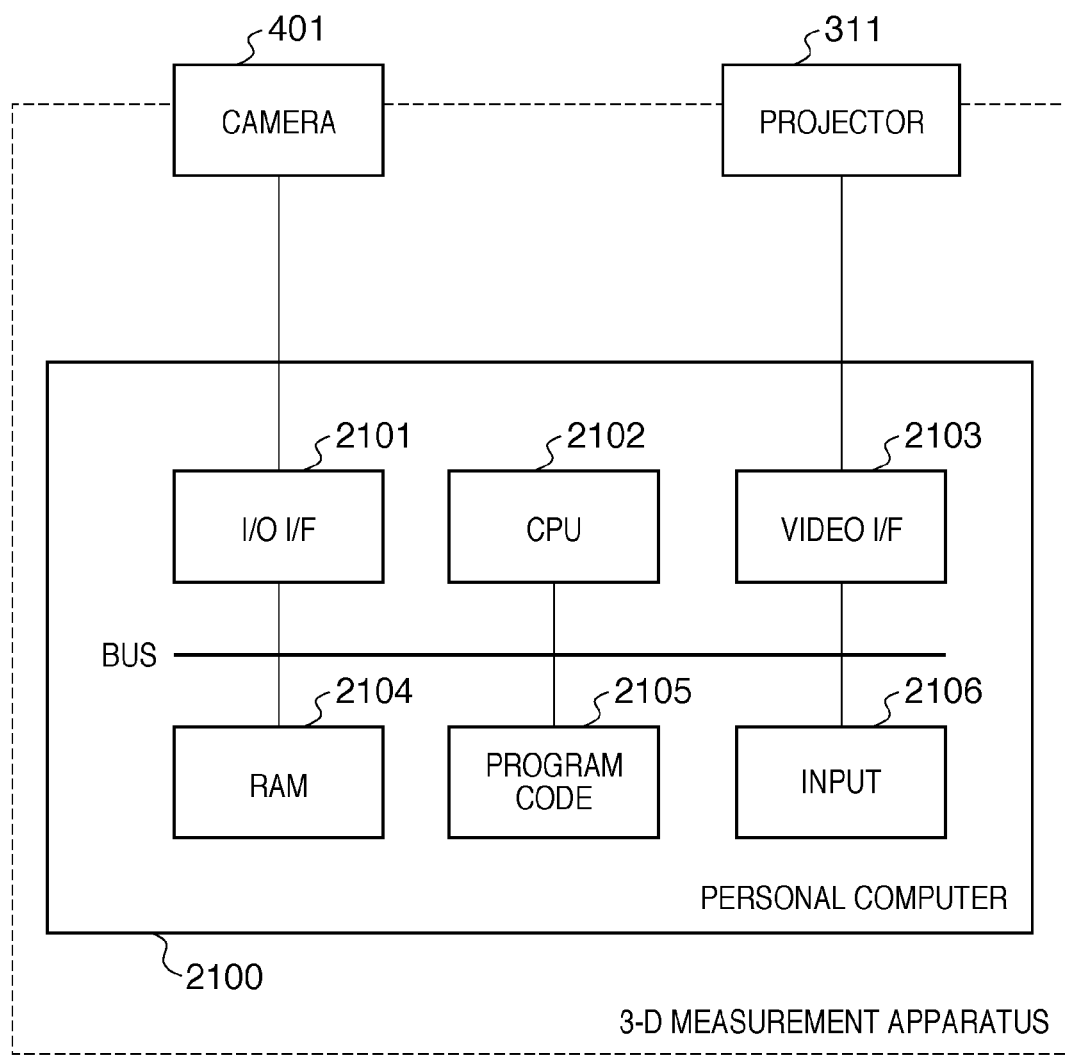
FIG. 11 is a block diagram showing an example configuration for implementing a position/orientation measurement method as a program in a Fourth Embodiment.

The processing units described in the First and Third Embodiments can also be executed as a program in a computer. FIG. 11 shows an example in which a camera 401 serving as the imaging unit 400 and a projector 311 serving as the pattern projection unit 310 are connected to a personal computer 2100 via an I/O interface 2101 and a video interface 2103. A CPU 2102, by reading out from memory and executing program code 2105 for causing a computer to execute the functions of the abovementioned embodiments, causes the computer to function as the three-dimensional measurement apparatus 1000 (1010). The program code 2105 may be executed after being loaded onto a RAM 2104 from a program memory or an external storage apparatus (not shown). An input unit 2106 is constituted by a keyboard, a mouse or the like.

At this time, an operating system may be used as a mechanism for efficiently using peripheral devices and the buses of the personal computer. The operating system may be provided separately to the program implementing the functions of the present invention, or a processing program implementing the functions of the present invention may be selected and executed as one of the application programs in the operation system.

Fifth Embodiment

The processing load on the projection position calculation unit 810 of the three-dimensional measurement apparatus 1000 increases when there is an increase in the number of triangular patches held in the geometric model holding unit 110. However, processing speed can be increased by sorting triangular patches beforehand with respect to the viewpoint of the projection coordinate system, in order to improve the efficiency of triangular patch searches.

Further, a graphics processor unit (not shown) constituting hardware for rendering three-dimensional computer graphics can be used to increase processing speed. Hardware that is able to read out values from a Z buffer can be used as the graphics processor unit. The graphics processor unit can be used to derive the distance to a plane close to the origin of the projection coordinates from the values in the Z buffer at the time of rendering. Coordinates including depth values can be transformed into a reference coordinate system by performing rendering such that a geometric model viewed from the origin of the projection coordinate system matches a normalized projection image plane, and seeking a Z buffer corresponding to the pattern coordinates. Also, the present embodiment is similarly applicable to equation (11) for calculating the projection pattern position m' on a projected image. High-speed calculation can be performed if a process of projecting a projection pattern M on a geometric surface onto a projection plane aligned with the imaging coordinate system is pursued using a projection transformation function of the graphics processor.

The present invention enables high-speed three-dimensional measurement using coded pattern projection because of the matching of a pattern on a captured image with projected patterns, which is based on the position of patterns computed based on a geometric model, thereby allowing correspondence to be performed more rapidly.

Aspects of the present invention can also be realized by a computer of a system or apparatus (or devices such as a CPU or MPU) that reads out and executes a program recorded on a memory apparatus to perform the functions of the above-described embodiments, and by a method, the steps of which are performed by a computer of a system or apparatus by, for example, reading out and executing a program recorded on a memory apparatus to perform the functions of the above-described embodiments. For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-001561, filed Jan. 6, 2010, which is hereby incorporated by reference herein in its entirety.

What is claimed is:

1. A three-dimensional measurement apparatus comprising:
   a geometric model holding unit configured to hold a geometric model of a measurement object;
   a coarse position/orientation obtaining unit configured to obtain information indicating a coarse position and orientation of the measurement object;
   a projection unit configured to project a plurality of types of patterns onto the measurement object;
   an imaging unit configured to image the measurement object onto which a pattern has been projected by the projection unit;
   a projection position prediction unit configured to predict coordinate values of the pattern on a captured image acquired by the imaging unit, based on the geometric model and the information indicating the coarse position and orientation;
   a distance calculation unit configured to search for a captured pattern on the captured image based on the coordinate values predicted by the projection position prediction unit, and to derive a distance between the imaging unit and a surface of the measurement object by corresponding the captured pattern with the projected pattern; and
   a position/orientation calculation unit configured to estimate the position and orientation of the measurement object using the distance derived by the distance calculation unit and the geometric model held in the geometric model holding unit, and to update the information on the coarse position and orientation held in the coarse position/orientation holding unit.

2. The apparatus according to claim 1,
   wherein the position/orientation calculation unit further generates an estimation state indicating a state of the position and orientation estimation performed on the measurement object, and
   the projection unit controls the patterns that are projected, based on the estimation state.

3. The apparatus according to claim 2,
   wherein the projection unit increases or decreases the types of patterns that are projected, based on the estimation state.

4. The apparatus according to claim 2,
   wherein the projection unit controls number of times for projecting a pattern, based on the estimation state.

5. The apparatus according to claim 1,
   wherein the patterns have a stripe pattern, and
   the projection unit changes a spacing between stripes of a pattern to be projected, based on a size of a change in the position and orientation of the measurement object computed by the position/orientation calculation unit.

6. The apparatus according to claim 1, further comprising a measurement model generation unit configured to generate a geometric model of the measurement object using a plurality of captured images obtained by causing the imaging unit to function while changing a positional relationship of the measurement object with the imaging unit and the projection unit, wherein the geometric model holding unit holds the geometric model generated by the measurement model generation unit.

7. A control method for a three-dimensional measurement apparatus comprising:
- a geometric model holding step of holding a geometric model of a measurement object in a geometric model holding unit;
- a coarse position/orientation obtaining step of obtaining information indicating a coarse position and orientation of the measurement object in a coarse position/orientation holding unit;
- a projection step of using a projection unit to project a plurality of types of patterns onto the measurement object;
- an imaging step of using an imaging unit to image the measurement object onto which a pattern has been projected in the projection step;
- a projection position prediction step of predicting coordinate values of the pattern on a captured image acquired in the imaging step, based on the geometric model and the information indicating the coarse position and orientation;
- a distance calculation step of searching for a captured pattern on the captured image based on the coordinate values predicted in the projection position prediction step, and of deriving a distance between the imaging unit and a surface of the measurement object by corresponding the captured pattern with the projected pattern; and
- a position/orientation calculation step of estimating the position and orientation of the measurement object using the distance derived in the distance calculation step and the geometric model held in the geometric model holding unit, and of updating the information on the coarse position and orientation held in the coarse position/orientation holding unit.

8. A non-transitory computer-readable medium storing a program for causing a computer to execute the control method for a three-dimensional measurement apparatus according to claim 7.

* * * * *